C. DANIEL.
Rotary-Harrow.
No. 40,741.
Patented Dec. 1, 1863.
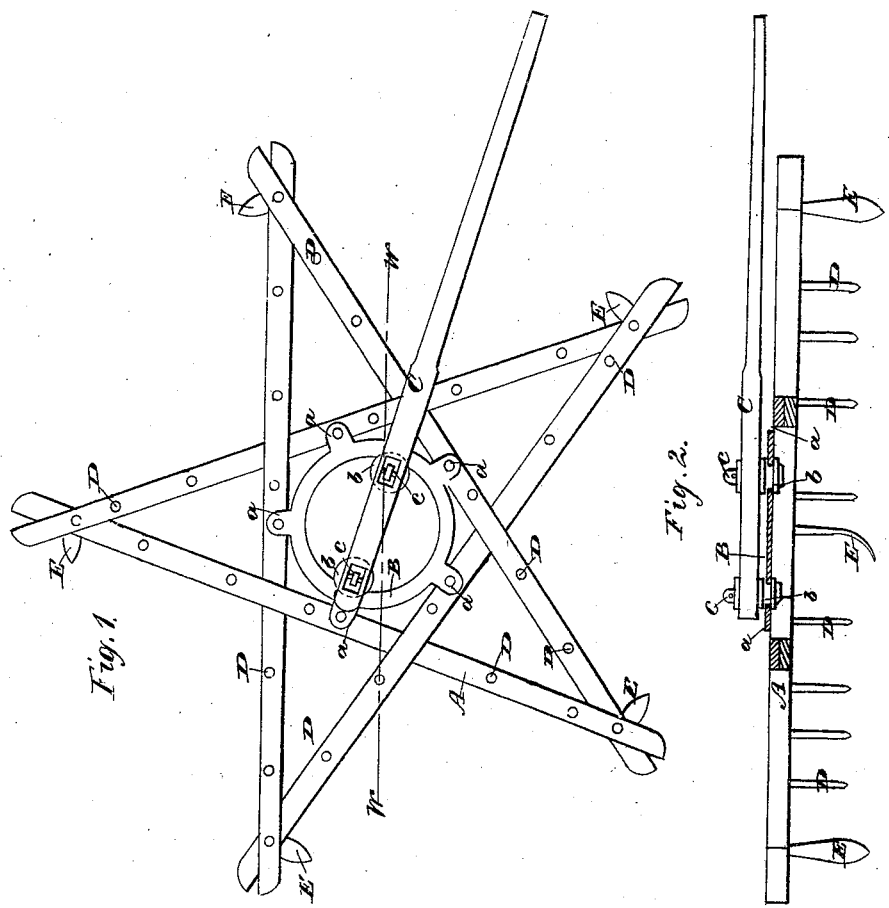
WITNESSES.
INVENTOR.

UNITED STATES PATENT OFFICE.

CHARLES DANIEL, OF SIGEL, MISSOURI.

IMPROVEMENT IN ROTARY HARROWS.

Specification forming part of Letters Patent No. 40,741, dated December 1, 1863.

*To all whom it may concern:*

Be it known that I, CHARLES DANIEL, of Sigel, in the county of Pettis and State of Missouri, have invented a new and Improved Rotary Harrow; and I do hereby declare that the following is a full, clear, and exact description of the same, reference being had to the accompanying drawings, forming a part of this specification, in which—

Figure 1 represents a plan or top view of my invention. Fig. 2 is a vertical central section of the same, the line *w w* indicating the plane of section.

Similar letters of reference in both views indicate corresponding parts.

This invention relates to an improvement in that class of harrows to which a rotary motion is imparted by the action of the teeth on the ground as the harrow is drawn along.

The distinguishing features of this improved harrow consist, first, in the shape of the frame; second, in the means employed for the purpose of connecting the draft-pole to the frame, and, third, in the application of gouges or shovels on the outer ends or corners of the frame and set deeper than the teeth and crooked in such a manner that the same take deeper hold on one side than on the other and cause the harrow to rotate as the same is drawn forward.

To enable others skilled in the art to make and use my invention, I will proceed to describe it.

A represents a frame made of wood or other suitable material in the shape of a star with five points, as clearly shown in Fig. 1 of the drawings. The center of the wooden frame, which forms a regular five-sided figure, is occupied by the ring B, which is made of sheet metal or other suitable material, and secured to said frame by screws or nails passing through lugs *a*, which project over the wooden beams of the frame. Said beams are firmly jointed together, as shown in the drawings, and they constitute a frame, which is strong and durable, and which can be made with but little trouble. In its operation this frame covers a comparatively large area. The ring B forms the guide for two grooved friction-rollers, *b*, which revolve freely on bolts *c*, that are inserted from below into the draft-pole C near to its inner end, and secured by means of wedges, or in any other suitable manner, in such a position that the distance of the extreme points on the inner circumference of the grooves of the rollers is equal, or nearly so, to the inner diameter of the ring B. By the application of the grooved rollers and ring therefor the draft-pole is firmly attached to the frame A, leaving the frame at liberty, however, to rotate freely in either direction. D D are a series of teeth, which are inserted into the under sides of the beams composing the frame A. These teeth are made round or square, of iron, steel, or any other suitable material, and sharp pointed for the purpose of pulverizing the ground, their length being equal to that of ordinary harrow-teeth.

To each of the five points of the star-shaped frame a curved shovel or gouge, E, is secured, and these gouges are somewhat longer than the teeth D, and they are all curved in the same direction. If the harrow is drawn forward, the gouges take hold of the ground on that side where the points are turned in the direction in which the harrow moves, and by these means a rotary motion is imparted to the frame. The draft-pole turns freely in the ring B in either direction, and the direction in which the harrow moves can be readily changed or reversed. The frame will begin to rotate as soon as it is drawn along in either direction.

The convenience of this harrow is unsurpassed. It is strong and durable in its construction, it is easily operated, and it can be readily transported from one spot to another.

What I claim as new, and desire to secure by Letters Patent, is—

1. A rotary harrow with a star-shaped frame, A, constructed and operating in the manner and for the purpose substantially as described.

2. The central guide-ring, B, in combination with the star-shaped frame A and with the grooved rollers *b*, attached to the draft-pole C, substantially as and for the purpose set forth.

3. The gouges E, secured to the corners of the star-shaped frame A, and operating in combination with the teeth D, and draft-pole C, substantially as and for the purpose specified.

CHAS. DANIEL.

Witnesses:
WM. M. VICKREY,
WM. DANIEL.